March 30, 1954   A. B. DE SALARDI   2,673,446
APPARATUS FOR PROCESSING COMBUSTION GASES
Filed Sept. 26, 1952   3 Sheets-Sheet 1
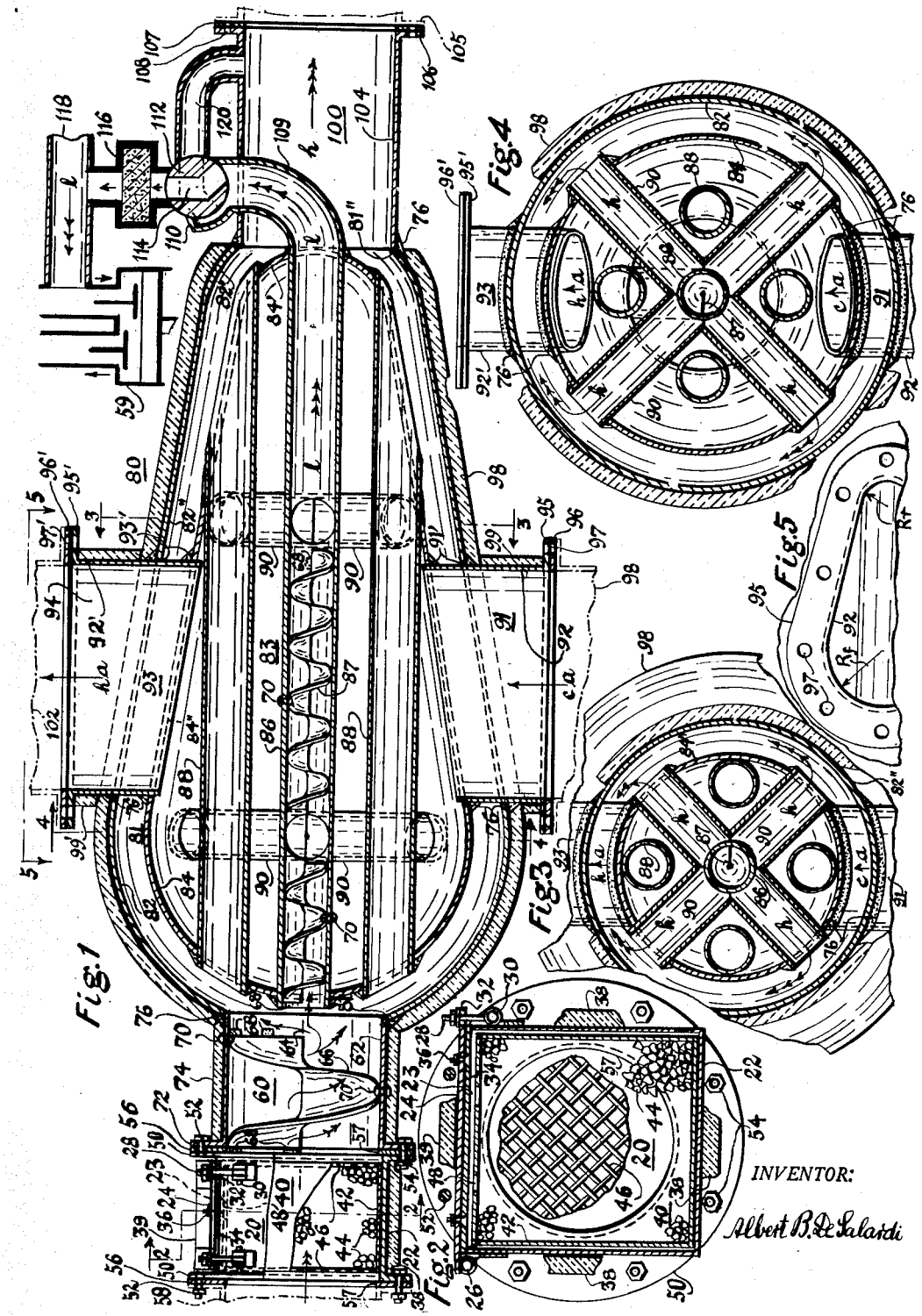
INVENTOR:
Albert B. De Salardi

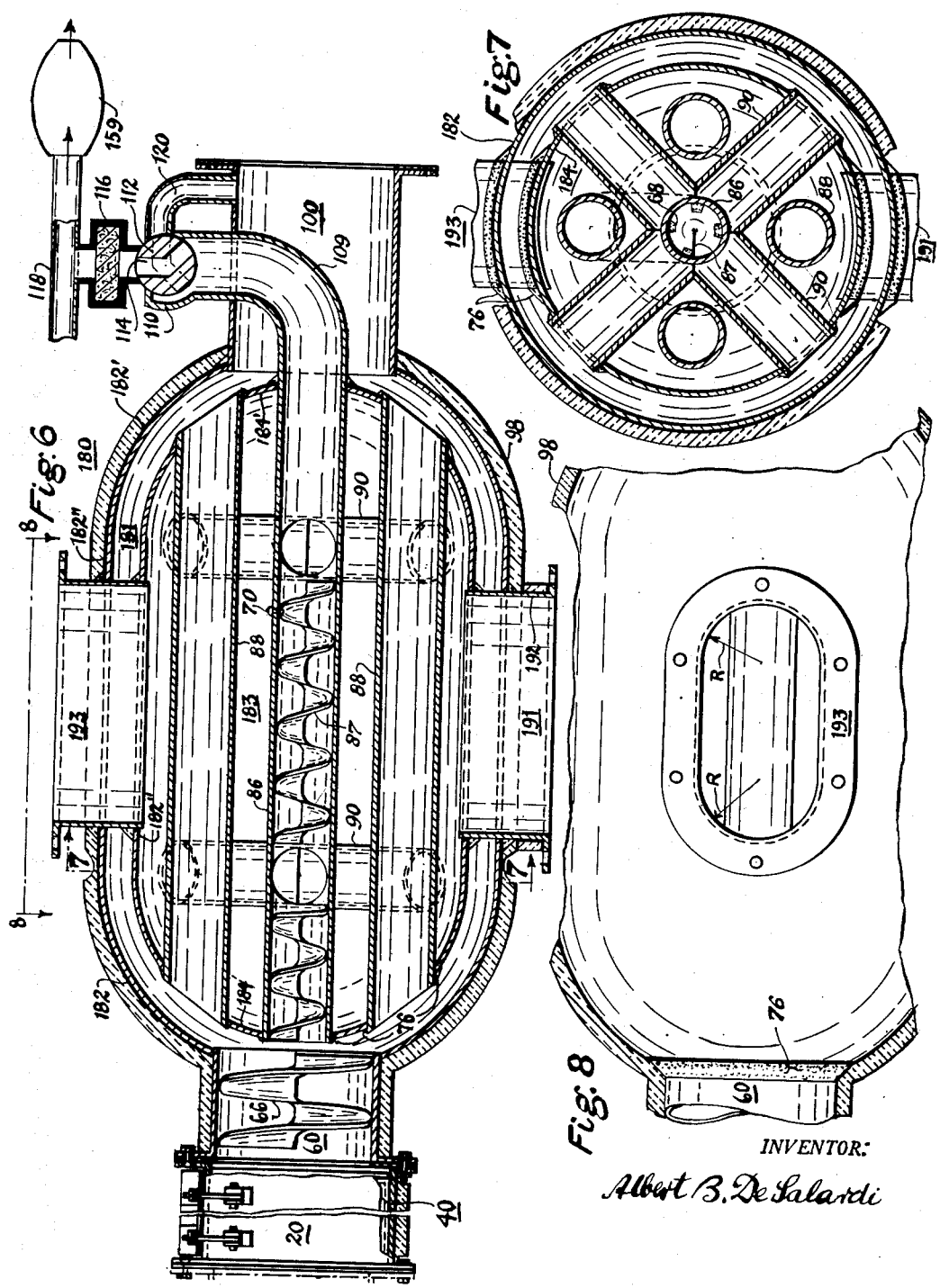

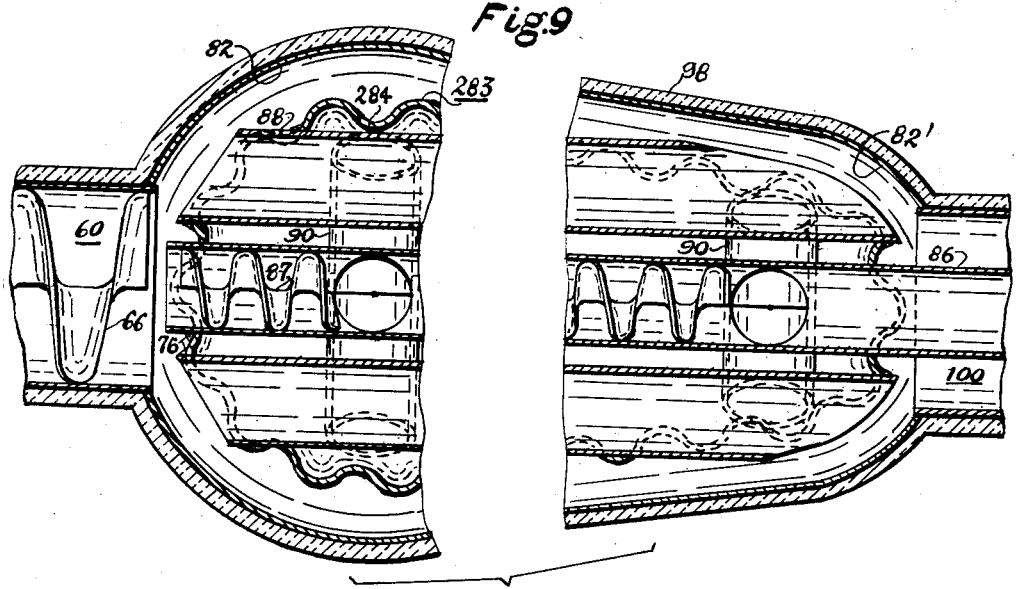
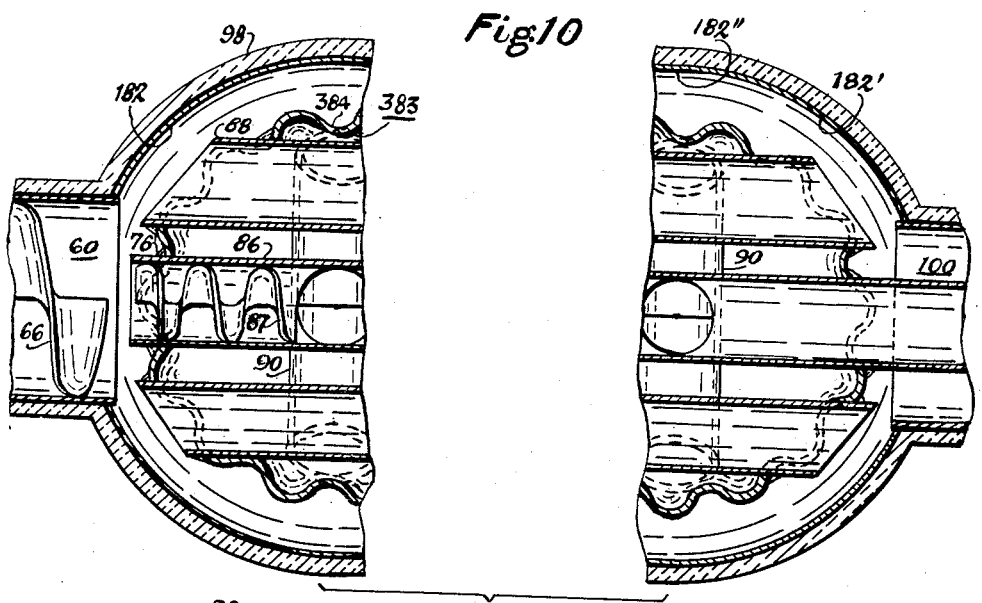
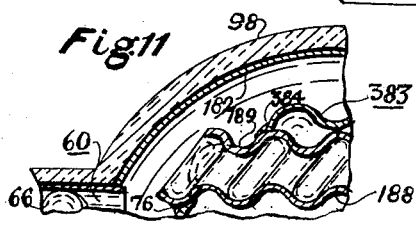

Patented Mar. 30, 1954

2,673,446

UNITED STATES PATENT OFFICE 2,673,446

APPARATUS FOR PROCESSING COMBUSTION GASES

Albert B. De Salardi, Wilkinsburg, Pa.; Mary De Salardi, administratrix of said Albert B. De Salardi, deceased Application September 26, 1952, Serial No. 311,764

4 Claims. (Cl. 60—39.17)

This invention pertains to devices for salvaging energy from combustion or exhaust gases from internal combustion engines of powered air, land, and water-crafts. I refer to these by the collective name of "craft."

Heretofore devices of this character released the combustion or exhaust gases unprocessed into the surrounding medium, air or water utilizing only a relatively small part of the energy contained therein by taking from them heat transmitted in a heating system of the craft.

Inasmuch as the exhaust gases from internal combustion engines always contain burnable constituents of some heat value such as hydrogen, carbon monoxide, hydrocarbons, the exhaust of these is a waste of energy. Furthermore the existing devices and methods lack means and provisions to produce hydrogen and carbon monoxide from water vapor, carbon dioxide and/or added carbon and to gain additional heat by exothermic reactions, nor are they capable to separate and/or concentrate and collect the burnable constituents and to convey these to the engine to be used in it as a complementary fuel.

These and other deficiencies and drawbacks are obviated by my invention the objects of which are to provide apparati for processing combustion or exhaust gases to utilize their heat and chemical energies to the fullest possible extent by: first, producing burnable, relatively light gases such as hydrogen and carbon monoxide from water vapor, carbon dioxide and ammonia contained in the exhaust gases having generally a temperature over 1,000° F. by catalytic and/or chemical reactions, second, raising the heat content of the gases by employing exothermic reactions, third, providing a chemical chamber carrying suitable catalysts and/or chemicals to carry out the desired reactions with the exhaust gases flowing therethrough, fourth, enclosing the catalysts and/or chemicals in one or more cartridge type of units fitting the inside cavity of the chemical chamber and provided with expanded, perforated or meshed sides through which the gases can enter and leave relatively unhindered, fifth, providing suitable opening, sealing and fastening means for the chemical chamber for rapid and convenient handling of the cartridges, sixth, employing a centrifuging chamber with rotary means inducing circular motion and producing centrifugal forces in the gases flowing therethrough causing radial separation and/or concentration of the gas constituents according to their particular specific gravities, seventh, providing a tubing, centrally located in the flowing gases for collecting the lighter, burnable constituents and carrying rotary means for a second centrifugal processing thereof, eighth, employing conductor means directing selectively the collected burnable gases through filtering means, eliminating from these solid matter, and subsequently to the fuel intake of the internal combustion engine to be used therein as complementary fuel or leading them to the atmosphere, ninth, providing a heat exchanger portion having an outer shell and an inner shell, the latter having throughgoing longitudinal central, peripheral and radial tubes communicating with the space between the shells, the central tube carrying rotary means for a second centrifugal processing of the collected lighter burnable gases, the inner shell having also ducts for leading air from the outside and into the heating system of the craft, tenth, providing heat insulators covering substantially the sides of the device which are exposed to the atmosphere, eleventh, submitting the exhaust gases to processing in the following steps: catalytic and/or chemical reactions enriching the hydrogen, carbon monoxide and light hydrocarbon content and/or raising the heat content, centrifugal separation and/or concentration of the light, burnable constituents, filtering them and using them as fuel after extracting some of the heat content by air cooling.

The achievement of these and other objects and advantages through my invention will become evident to those versed in the art when perusing this specification and the accompanying drawing in which:

Fig. 1 is a semi-diagrammatic longitudinal sectional view of the first preferred embodiment of my invention composed of a chemical chamber, an adjacent centrifuging chamber, a heat exchanger portion and an exhaust outlet control portion. The chemical chamber, receiving the exhaust gases at the left from an internal combustion engine, carries a cartridge type container with catalysts and/or chemicals; the centrifuging chamber has suitably curved vanes for rotating the gases; the heat exchanger portion is provided with streamlined outer and inner shells the latter having throughgoing central, peripheral and radial tubes and suitable air ducts; the exhaust outlet control portion employs a three way valve and a filter communicating with the fuel intake of the internal combustion engine for selectively directing the lighter burnable constituents of the exhaust gases from the central tube into the engine or selectively discharging them into the atmosphere;

Fig. 2 is a composite sectional view through the chemical chamber taken on broken line 2—2 in Fig. 1;

Fig. 3 is a partial cross sectional view taken on line 3—3 in Fig. 1;

Fig. 4 represents a partial cross sectional view taken on line 4—4 in Fig. 1;

Fig. 5 shows a partial plan view taken on line 5—5 in Fig. 1;

Fig. 6 is a semi-diagrammatic longitudinal view, chiefly in section, of the second preferred embodiment of my invention which differs from the first one (represented by Figs. 1 to 5) chiefly in that the shells of the heat exchanger portion are substantially cylindrical capped by equal convex end portions and the exhaust gases are taken from and the fuel gas constituents are returned to a jet engine;

Fig. 7 is a partial cross sectional view taken on line 7—7 in Fig. 6;

Fig. 8 shows a partial plan view taken on line 8—8 in Fig. 6;

Fig. 9 is a partial semi-diagrammatic longitudinal sectional view of a third preferred embodiment of my invention which differs from the first one (shown in Figs. 1 to 5) only in that the walls of the inner shell are corrugated;

Fig. 10 is a partial semi-diagrammatic longitudinal sectional view of the fourth preferred embodiment of my invention which differs from the second one (represented by Figs. 6 to 8) only in that the walls of the inner shell are corrugated;

Fig. 11 is a fragmental semi-diagrammatic longitudinal sectional view of the fifth preferred embodiment of my invention which differs from the fourth one only that also the peripheral tubes of the inner shell are corrugated.

Same parts are denoted by the same reference numerals throughout the several figures of the drawing.

Referring to the drawing by the characters of reference, in the first embodiment of my invention, represented by Figs. 1 to 5, chemical chamber, designated generally by 20 receives the exhaust gases at left in the direction of the double headed arrow. As best shown in Fig. 2 chemical chamber 20 is composed of housing 22 shown to be shaped as a four sided prism one side 23 of which, preferably the top one is open and is coverable by lid 24 fastened by hinges 26 and hinged bolts 28 to the adjoining sides of housing 22 which carries also suitable fulcrum pins at 30 for bolts 28. Lid 24 is provided with endwise open slots 32 each of which registers with, and admits one, hinged bolt 28 in closed position of lid 24. Suitably shaped gasket 34 is fastened with approved means such as rivets or bolts 36 (shown) and/or cemented to the inner side of lid 24 sealing housing 22 against escape of the exhaust gases flowing under pressure therein.

The outer surfaces contacting the atmosphere of housing 22 are covered with one or more layers of non carbonizing heat insulating material 38 such as asbestos or other well known insulators and lid 24 is also covered with suitably shaped insulator 39 reducing the heat losses to the atmosphere thereby increasing the efficiency of the processes conducted in the device.

Housing 22 accommodates a catalytic and/or chemical cartridge generally designated by 40 which is composed of a box or container 42 suitably shaped to fit the interior cavity of housing 22 and is introduceable thereinto, respectively extractable therefrom, through the open side or aperture 23. Container 42 carries a charge of catalytically and/or chemically active materials 44 in comminuted, granular, spongy or pulverized form offering sufficiently large surface for the desired reactions with the exhaust gases and ample intergranular space for their passage therethrough without appreciable resistance or excessive pressure drop. Sides 46 of container 42 extending laterally and through which the gases enter and leave the chemical chamber 20 are from perforated, expanded, latticed or meshed (as shown: the sides 46 being designated as perforated) material which may be also catalytically or chemically reactive upon the gases; the perforations or openings are suitably small to retain the charge in the cartridge but large enough for the required flow of the gases. Cartridge 40 may be substituted by a plurality of smaller cartridges (not shown) each charged with the same or differing reactive material. At least one side of container 42, preferably that which is located adjacent to opening 23, is provided with means for lifting tool engagement such as holes 48.

Attachment means such as circular flanges 50, flat headed bolts 52, hexagonal headed bolts 54 and sealing means such as gasket 56 of heat resisting material with central opening 57 are provided for housing 22; the attachment means serving to fasten it to the flanged exhaust pipe 58 (shown in chain lines at the left) bringing the exhaust gases from internal combustion engine 59, and also to the centrifuging chamber, generally denoted by 60, on the right side, gaskets 56 preventing the escape of any substantial amount of the exhaust gases into the atmosphere. The outer sides of the attachment means are shown to be bare and/or covered in part by insulator 38; it is obvious that they may be entirely covered. The catalytically and/or chemically reacting materials 44 are carbon, certain metals such as iron, chromium, thorium, nickel, platinum, potassium, aluminum, iridium, rhodium, etc. and their oxides, all well known and used in the manufacture of hydrogen, carbon monoxide and other fuel gases.

Centrifugal chamber 60 is composed of a preferably cylindrical tubular body 62 having longitudinal central axis 64 and being provided with rotary means such as internal, suitably curved stationary vanes or blades, singular, or continuous, deflecting the gases flowing through the chamber to follow a circular path about axis 64 and be subject to centrifugal separation according to the specific gravities of the constituents. A preferred shape of the deflecting vanes is a continuous helical surface 66 the helix angle of which can be determined by the skill of a mechanic taking into consideration the pressure and velocity of the gases, their specific gravities, the dimensions of tubular body 62 and the desired separating effect. Fig. 1 shows helical vane 66 having an axial length of one turn or 360° only but it will be understood that it may extend over any desired length or number of turns. Holdfast means such as spots welds 68 and plug welds 70 fasten helical vane 66 to tubular body 62. It is obvious that instead welding, brazing, riveting, bolting or any other approved means of fastening may be used. Attachment means, such as flange 72, rigidly fixed to, or integral with tubular body 62, screws 52 and 54 and sealing means such as gasket 56 fasten centrifuging chamber 60 securely to catalytic chamber 20. Heat insulator 74 covers the atmospheric side of chamber 60 and may enclose the attachment means entirely.

Rigidly fixed to tubular body 62 by known fastening means such as by continuous circumferential sealing seam weld 76 is the heat exchanger portion, generally denoted by 80, composed from the following parts each of which is generally designated by the numerals assigned: an outer shell 81, an inner shell 83, an air-inlet duct 91, an air-outlet duct 93 and an exhaust outlet control portion 100.

Outer shell 81 is a substantially streamlined elongated vessel having an axis of symmetry coinciding with axis 64 terminating with an outwardly convex, preferably spherical surfaced front end 82 (in the direction of the normal travel of the craft) and a similar rear end 82' having smaller radii of curvature, each having a cut-out or aperture 81' and 81'', respectively, coaxial with axis 64 and communicating with centrifuging chamber 60 and exhaust outlet control portion 100, respectively. Ends 82 and 82' are sealingly connected with an outwardly convex tubular middle portion 82'' which is preferably a conical frustrum and has suitable cutouts or apertures 91' and 93' to receive air-inlet duct 91 and air-outlet duct 93, respectively, sealingly attached thereto by suitable fastening means such as circumferential seam welds 76.

Inner shell 83 is a substantially streamlined and similarly shaped vessel as outer shell 81, the former having smaller dimensions and is carried by and within the latter. Inner shell 83 has also outwardly concave, preferably spherical front end 84, rear end 84' of smaller radii of curvature and a sealingly connecting, preferably conical middle portion 84''. The differences between corresponding dimensions of outer and inner shells are such that the free cross sectional areas between them satisfy the particular flow requirements of the exhaust gases and allow volumetric expansion for sound dampening effect. In Figs. 1, 3 and 4 these numerical differences are shown to be substantially constant but it is obvious that they may vary according to choice and design of the apparati.

Inner shell 83 has suitable cutouts 91' and 93' for insertion of air ducts 91 and 93, respectively.

Inner shell 83 has suitable cutouts or apertures to admit one longitudinal central tube 86, a plurality of longitudinal peripheral tubes 88 and a plurality of radial or cross tubes 90 sealingly attached to the inner shell by suitable fastening means such as continuous circumferential seam welds 76; except 86 all these tubes communicate in both directions with the space between shells 81 and 83, tube 86 communicates as one and only. The radial tubes 90 also communicate with central tube 86.

Longitudinal central tube 86 is provided with internal rotary means such as stationary vanes or blades 87 which may be singular or, as shown, continuous and suitably curved to deflect the gases, flowing through the tube, to follow a circular path developing centrifugal forces causing separation of the gas constituents according to their different specific gravities. The preferred shape of the vanes shown is having a continuous helical surface the helix angle and number of turns to be determined by the skill of the mechanic upon data of design specified, just as in case of vanes 66. Suitable holdfast means such as spot welds 68 and plug welds 70 fasten vanes 87 to the wall of central tube 86.

Air-inlet duct 91 consists of a tubular body 92 which, as shown in Fig. 5, is streamlined in the same direction as outer and inner shells 81 and 83 having outwardly convex, preferably cylindrical frontward and rearward ends the former having a radius of curvature $R_f$ and the latter $R_r$ where $R_f$ is larger than $R_r$; the lateral sides are plane, as shown connecting the curved ends, or may be outwardly convex. Tubular body 92 is sealingly attached to both shells along their cutouts or apertures 91' by suitable fastening means such as continuous circumferential seam welds 76 and is provided with suitable attachment and sealing means such as flange 95 and gasket 96, respectively, both having suitable holes 97 for bolts (not shown) fastening it to any air inlet structure 98 (shown in chain lines) which the craft may possess.

Air outlet duct 93 is similarly constructed as air-inlet duct 91, has preferably the same dimensions and is the same way attached to the inner and outer shells along their cutouts or apertures 93' by sealing, continuous circumferential seam welds 76. The ducts are preferably positioned, as shown, so that outlet duct 93 lies in the vertical projection above the air-inlet duct 91 for promoting air circulation by utilizing the upwardly rising tendency of the heated air but it should be understood that the location and dimensions of the ducts are a matter of choice depending upon the design of the air circulating system of the craft; air enters and leaves as per arrows "ca" and "ha," respectively. To accentuate this the corresponding parts of outlet-duct 93 are denoted by primed numerals. So 92' designates the tubular body of air-outlet duct 93, 95' its flange, 96' its gasket and 97' its bolt holes. Insulator 98 covers the outer surface of outer shell 81 and insulator 99 and 99' the outer surfaces of air-inlet duct 91 and air-outlet duct 93, the latter being connected and in communication with the heated air-distributing system (shown in chain lines) 102 of the craft.

Exhaust outlet control portion 100 has a tubular, preferably cylindrical body 104 of suitable cross sectional areas and is rigidly and sealingly joined with the rear end 82' of outer shell 81 along cutout 81'' by continuous circumferential seam weld 76. Tubular body 104 communicates with the interior of outer shell 81 at one side (through cutout 8'') and on the other side with the exhaust distributing system 105 (shown in chain lines) of the craft. Flange 106, integral with or rigidly attached to tubular body 104, and gasket 107, provided with the necessary boltholes 108 and bolts serve as attachment means to the exhaust distributing system 105 which communicates with the atmosphere. Longitudinal central tube 86 is sealingly connected through a suitable bend 109 to a known three-way valve 110, shown to be located outside of tubular body 104, and having a valve body 112 provided with a duct 114, which, in the position shown, establishes communication between longitudinal central tube 86 and known filter 116 that retains solid particles from the gases and the outlet of which communicates with the fuel supply pipe or manifold 118 of internal combustion engine 59. Turning valve body 112 by suitable number of degrees (shown to be 90°) duct 114, in its new position (shown in chain lines) connects longitudinal central tube 86 through bypass 120 with tubular body 104. While Fig. 1 shows three-way valve 110 outside of tubular body 104, it is obvious that it may be located inside of the tubular body the latter being provided with correspondingly increased cross sectional areas required for suitable flow of the gases.

Flanged and bolted attachment means were shown to fasten engine exhaust piping 58, the chemical chamber 20, centrifuging chamber 60, heat exchanger portion 80, air inlet structure 98, air distributing system 102, exhaust distributing system 105 wherever one of these structures joins the adjacent one but it will be understood that the attachment means are not restricted to the flanged and bolted ones but may be of any approved type such as screwed, fused, flexible ball jointed, etc.

The described first preferred embodiment of my invention operates as follows:

The hot exhaust gases from internal combustion engine 59 are led by suitable exhaust piping (not shown) through its flanged end portion 58 (shown in chain lines) into chemical chamber 20 passing through perforated or meshed sides 46 of cartridge 40 and the therein contained catalytic and/or chemical substances 44 which induce, accelerate and maintain in the gases chemical reactions resulting in the enrichment thereof especially of hydrogen and carbon monoxide and taking advantage of exothermic reactions to raise the temperature of the obtained gas mixture.

The catalysts and/or chemicals 44 used are well known such as carbon, metallic iron, chromium, thorium, platinum, potassium, aluminum, iridium, rhodium, etc. and their oxides and the resulting reactions are similar to those obtained with water gas, the chief constituents of which are hydrogen and carbon monoxide. I am substituting water gas by exhaust gas which is enriched in hydrogen and carbon monoxide in the chemical chamber hence the resulting reactions will be qualitatively the same as obtained with water gas. As exhaust gases contain a relatively large amount of water vapor at high temperature (1,000° F. and over) hence every known catalytic and/or chemical reaction for producing hydrogen from water may be utilized by my invention.

Some exemplary catalytic and/or chemical reactions occurring in the processing of the exhaust gases by the invented device:

$$C + H_2O \rightleftarrows CO + H_2$$

or in words, carbon contained in substance 44 and water vapors at suitable temperature yield hydrogen and carbon monoxide enriching the exhaust gases with these fuel gases.

$$H_2 + CO + H_2O \rightleftarrows 2H_2 + CO_2$$

or in words, water gas and steam passed over a catalytic mixture of the oxides of iron, chromium and thorium at 500° C. or 932° F. yield hydrogen and carbon dioxide.

Note, that the resulting hydrogen and carbon dioxide widely differ as to their specific gravities (.0696 and 1.520, respectively) hence are substantially separable from each other by centrifugal processing such as given in centrifuging chamber 60 and central longitudinal tubing 86.

Where the exhaust gases contain ammonia the latter will break down with the help of suitable catalysts added to substance 44:

$$2NH_3 \rightleftarrows N_2 + 3H_2$$

The above and the following reactions are described in almost any advanced textbook of chemistry, as a specific authority for the aforegoing reactions I cite Prof. Harry N. Holmes: "Introductory College Chemistry" Rev. Ed. pp. 66, 67.

$$3Fe + 4H_2O \rightleftarrows Fe_3O_4 + 4H_2 + 38{,}400 \text{ calories}$$

This reaction is exothermic adding heat to the resulting gas mixture and expressed in words: metallic iron with steam give iron oxide plus hydrogen and the indicated amount of heat according to the iron-steam process. (See Prof. Allen Rogers: "Industrial Chemistry" 5th Ed. vol. 2, p. 810.)

$$CO + H_2O \text{ at } 500°\text{ C.} \rightleftarrows CO_2 + H_2 + 10{,}000 \text{ calories}$$

(See Prof. William Thornton Read: "Industrial Chemistry" p. 172.)

The resulting hydrogen and carbon dioxide may be separated by centrifugal processing as explained previously.

Having undergone catalytic and/or chemical processing, which I call collectively chemical processing, the exhaust gases and new constituents pass from the chemical chamber 20 into centrifuging chamber 60 for centrifugal separation. Helical vanes 66 deflect the flowing gases forcing them to rotate about axis 64 (as shown by the double headed arrows) generating centrifugal forces therein and causing separation of the constituent gases according to their specific gravities, segregating the lighter ones such as hydrogen, carbon monoxide and some nitrogen toward the axis 64 and the heavier constituents such as carbon dioxide toward the periphery of the passageway, more particularly toward the space between outer shell 81 and inner shell 83 and also toward longitudinal peripheral tubes 88 and finally through the exhaust outlet control portion 100 into the atmosphere.

The lighter gas constituents such as hydrogen and carbon which I call collectively fuel gases, are directed by centrifugal forces toward axis 64 and into longitudinal central tube 86 where they are subjected to a second centrifuging or concentrating action induced by helical vanes 87 which expel most of the heavier constituents through radial tubes 90 toward the space between the shells so as to join the previously ejected heavier gases in their journey toward the atmosphere.

The path of the lighter gases resulting from the second centrifugal processing is shown by the triple headed arrows with an appended "l," that of the heavier ones by a triple headed arrow with an appended "h."

The light constituents are directed by the end portion of longitudinal central tube 86 toward three-way valve 110 and, in the position shown in Fig. 1, toward filter 116 which retains solid impurities and from which the cleaned fuel gases enter manifold 118 of internal combustion engine 59 to be used as part of the fuel for the engine.

If operating conditions are such that this fuel is not desired the three-way valve body 112 is turned into the exhaust position (shown by chain lines), directing the lighter gas constituents into the exhaust outlet control portion 100 and subsequently into the atmosphere.

Cold air from the atmosphere enters through air-inlet duct 91, passes through inner shell 83 sweeping its inner surface as well as the outer surfaces of longitudinal peripheral tube 88, longitudinal central tube 86 and radial tubes 90 in heat transmitting relationship taking up heat from the exhaust gases and/or additional gases produced by the chemical processing in chemical chamber 20.

The heated air enters via the air-outlet duct 93 the heated air distributing system 102 of the craft.

In the heat exchanger portion 80 the passages for air and those for the exhaust gases are separated and sealed from each other preventing intermixture; they form two sets of passages one extending over the other or through the other which structure I characterize that the two sets of passages are transpiercing each other.

As the passages for the exhaust gases are so dimensioned that they provide for predetermined volumetric expansion of, and corresponding pressure drop in the exhaust gases the structure is effective also as a muffler, dampening the sounds generated by the operation of the internal combustion engine 59.

The insulators 74, 98, 99, 99', 38 and 39 affixed to the outer surfaces of the device reduce the heat losses to the atmosphere thereby increasing the efficiency of the operations conducted therein.

Figs. 6 to 8 illustrate the second preferred embodiment of my invention which differs from the first one (represented by Figs. 1 to 5) in the shapes of the heat exchanger portion, the air ducts and is shown attached to an internal combustion engine 159 which is a jet engine powering the craft.

The heat exchanger portion, generally denoted by 180 is composed of outer shell 181 which is an elongated vessel having an axis of symmetry coinciding with axis 64 and terminating in outwardly convex, preferably spherical front-end 182 and an equal rear-end 182' which ends are sealingly connected by an outwardly convex, preferably cylindrical tubular middle portion 182''.

Inner shell 183 is a vessel similarly shaped as outer shell 181, the former having smaller dimensions and being carried by and within the latter. Inner shell 183 has outwardly convex, preferably spherical front-end 184, an equal rear-end 184' and a sealingly connecting preferably cylindrical middle portion 184''.

Inner shell 183 has suitable cut-outs or apertures to admit one longitudinal central tube 86, a plurality of longitudinal peripheral tubes 88 and a plurality of radial or cross tubes 90 sealingly attached to the inner shell by suitable fastening means such as continuous seam-welds 76.

Air-inlet duct 191 has a tubular body 192 provided with outwardly convex, preferably cylindrical frontward and rearward ends of preferably equal radii of curvature R; the lateral sides are preferably plane as shown, or they might be outwardly convex.

The air-outlet duct 193 is similarly shaped as the inlet-duct and has preferably the same dimensions.

Fig. 9 illustrates the third preferred embodiment of my invention which differs from the first one (shown in Figs. 1 to 5) only in that the inner shell, generally designated by 283, has corrugations 284 providing a greater heat transmitting surface.

Fig. 10 represents the fourth preferred embodiment of my invention which is the same as the second embodiment (shown in Figs. 6 to 8) except that the internal shell 383 is provided with corrugations 384.

Fig. 11 illustrates the fifth preferred embodiment of my invention which is the same as the fourth one except that the longitudinal peripheral tubes 188 are also provided with corrugations 189.

The operation of the second, third, fourth and fifth embodiments is the same as that of the first one, hence its description is not repeated.

In the aforegoing I have made a complete disclosure of my invention by describing and showing five preferred embodiments and the operations thereof but it will be understood that they are illustrations only and I do not intend to be limited by them to the exclusion of equivalent or repetitious structures, but what I claim as new and wish to secure by Letters Patent is what the appended claims define.

I claim:

1. In a craft, powered by at least one internal combustion engine and having a heated air distributing system, a muffler-heater comprising a chemical chamber receiving constituents of the exhaust gases from said engine, chemically and catalytically active material carried in said chemical chamber producing fuel gases from at least one of said constituents, a centrifuging chamber communicating with said chemical chamber, rotary means in said centrifuging chamber inducing circular motion in said exhaust and fuel gases raising centrifugal forces therein whereby the lighter gas constituents are segregated toward, and the heavier constituents away from, the center of said centrifuging chamber, heat exchanger means communicating with said centrifuging chamber and including separate atmospheric air passage means and exhaust gas passage means in heat transfer relationship, said air passage and exhaust gas passage means sealed from each other, said exhaust gas passage having means for leading said lighter gas constituents toward the fuel inlet of said internal combustion engine to be utilized as a portion of its fuel and directing the heavier constituents toward the atmosphere and gas filtering means inserted in said exhaust gas passage means retaining solid impurities from said fuel gases.

2. In a craft, powered by at least one internal combustion engine and having a heated air distributing system, a muffler heater comprising a chemical chamber receiving constituents of the exhaust gases from said engine, chemically and catalytically active material carried in said chemical chamber producing fuel gases from at least one of said constituents, a centrifuging chamber communicating with said chemical chamber, rotary means in said centrifuging chamber inducing circular motion in said exhaust and fuel gases raising centrifugal forces therein whereby the lighter gas constituents are segregated toward, and the heavier constituents away from the center of said centrifuging chamber, heat exchanger means communicating with said centrifuging chamber and including separate atmospheric air passage means and exhaust gas passage means in heat transfer relationship, said air passage and exhaust gas passage means sealed from each other, said exhaust gas passage means leading said fuel gases toward the fuel inlet of said internal combustion engine to be utilized as a portion of its fuel and directing the heavier constituents toward the atmosphere and gas filtering means inserted in said exhaust gas passage means retaining solid impurities from said fuel gases, said atmospheric air passage means having a tubular air inlet duct connected to the atmosphere and a tubular heated air outlet duct connected to said heated air distributing system, a container fitting the interior of said chemical chamber and accommodating said active material and heat insulator means affixed to the outside of said muffler heater for reducing the heat losses to the atmosphere, said heat exchanger means including an outer shell and a smaller inner shell, the former enclosing the latter, one longitudinal central tube, a plurality of longitudinal peripheral tubes and radial tubes sealingly extending through said inner shell communicating with the space between said shells and rotary means carried by said longitudinal central tube subjecting the gases therein to a second centrifugal processing.

3. Muffler heater according to claim 2 in which both said rotary means include continuous spiral vanes rigidly fixed to the interior of said centrifuging chamber and said longitudinal central tube, respectively, and said exhaust gas passage means is provided with a valve selectively directing said fuel gases toward said filter means and toward the atmosphere, respectively.

4. In a craft, powered by at least one internal combustion engine and having a heated air distributing system, an apparatus for processing combustion gases comprising a chemical chamber receiving constituents of said combustion gases, chemically and catalytically active material carried in said chemical chamber producing fuel gases from at least one of said constituents, a centrifuging chamber communicating with said chemical chamber, rotary means in said centrifuging chamber inducing circular motion in said gases raising centrifugal forces therein whereby the lighter gas constituents are segregated toward, and the heavier constituents away from, the center of said centrifuging chamber, heat exchanger means communicating with said centrifuging chamber placing said gases in heat transferring relationship with air in said heated air distributing system, conductor means leading said fuel gases toward the fuel inlet of said internal combustion engine to be utilized as a portion of its fuel and directing the heavier constituents toward the atmosphere and gas filtering means inserted in said conductor means retaining solid impurities from said fuel gases.

ALBERT B. DE SALARDI.

References Cited in the file of this patent

UNITED STATES PATENTS

| Number | Name | Date |
|---|---|---|
| 1,590,885 | Burns et al. | June 29, 1926 |
| 1,605,484 | Thompson et al. | Nov. 2, 1926 |
| 1,756,897 | Bilsky | Apr. 29, 1930 |
| 1,940,700 | Riehm | Dec. 26, 1933 |

FOREIGN PATENTS

| Number | Country | Date |
|---|---|---|
| 469,160 | Great Britain | July 20, 1937 |